United States Patent [19]

Doyle et al.

[11] Patent Number: 4,601,931

[45] Date of Patent: Jul. 22, 1986

[54] HIGH DENSITY, MOISTURE RESISTANT MICA CYLINDERS

[75] Inventors: Arthur F. Doyle, Portsmouth; Dennis J. Sklarski, Deerfield, both of N.H.

[73] Assignee: Essex Group, Inc., Fort Wayne, Ind.

[21] Appl. No.: 776,108

[22] Filed: Sep. 16, 1985

Related U.S. Application Data

[63] Continuation of Ser. No. 649,348, Sep. 11, 1984, abandoned.

[51] Int. Cl.[4] .......... B32B 15/02

[52] U.S. Cl. .......... 428/36; 428/324; 428/363; 428/454

[58] Field of Search .......... 428/35, 36, 323, 363, 428/454, 403

[56] References Cited

U.S. PATENT DOCUMENTS

| | | | |
|---|---|---|---|
| 1,975,078 | 10/1934 | Boughton | 428/363 |
| 2,810,425 | 10/1957 | Heyman | 428/363 X |
| 2,865,426 | 12/1958 | Heyman | 428/363 X |
| 2,914,426 | 11/1959 | Gaines, Jr. | 428/454 X |
| 2,949,150 | 8/1960 | Traynor, Jr. | 428/324 |
| 4,122,062 | 10/1978 | Monte et al. | 428/406 X |
| 4,371,579 | 2/1983 | McCaskey | 428/324 X |
| 4,374,892 | 2/1983 | Roberts | 428/324 X |

*Primary Examiner*—Lorraine T. Kendell
*Attorney, Agent, or Firm*—Alan C. Cohen

[57] ABSTRACT

High density, moisture resistant, high temperature stable mica tubular structures and methods of making the same are described. The structures comprise one or more mica paper layers impregnated with a polysiloxane binder, said binder containing an organic titanate and a metal naphthenate. Also disclosed are methods for making such tubular mica composite structures by impregnating mica papers with such composition, rolling the impregnated papers into cylindrical form and curing the cylinder.

5 Claims, 1 Drawing Figure

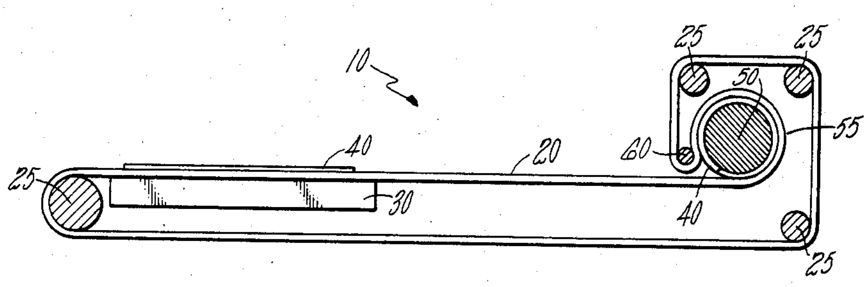
10
25
40
30
20
25
25
50
55
60
40
25

HIGH DENSITY, MOISTURE RESISTANT MICA CYLINDERS

CROSS REFERENCE TO RELATED APPLICATIONS

This is a continuation of U.S. Ser. No. 649,348, filed Sept. 11, 1984, now abandoned, for HIGH DENSITY MOISTURE RESISTANT MICA CYLINDERS filed by Arthur F. Doyle and Dennis J. Sklarski.

TECHNICAL FIELD

The field of art to which this invention pertains is mica containing composite material.

BACKGROUND ART

Mica containing cylinders have been used for many years as electrical insulating structures such as standoffs. Typically, such mica cylinders are composite structures formed by impregnating mica sheeting with a polymeric binding agent and wrapping the sheeting about a form. The mica cylinder is then heated to cure the binder and form the cylinder. Such articles have good dielectric strength, heat stability and are relatively inexpensive. However, these mica products are susceptible to attack by moisture, are relatively easy to fracture, and are not always uniform in thickness or dimensionally stable at high temperatures. In addition, such mica products are not stain resistant and have relatively poor machinability characteristics.

Therefore, what is needed in the art are mica composite cylinders which overcome such problems.

DISCLOSURE OF THE INVENTION

The present invention is directed toward a relatively high density, mica cylinder comprising one or more mica papers which are impregnated with about 5 percent to about 14 percent by weight of a polysiloxane binder which contains about 1 percent to about 4 percent by weight of an organic titanate and about 0.5 percent to about 2 percent by weight of a metal naphthenate. Such mica cylinders have improved moisture resistance, thermal stability, dimensional stablility and strength and stain resistance over that of the prior art. In addition, such structures are scour resistant and have improved machinabilty.

Another aspect of the invention is a method of forming such cylinders by impregnating mica paper with about 5 percent to about 20 percent by weight of a polysiloxane binder which contains about 1 percent to about 4 percent of an organic titanate and about 0.5 percent to about 2 percent by weight of a metal naphthenate, wrapping the impregnated papers about a form and densifying and curing the binder under pressure and temperature, while restrained, to form the improved moisture resistant cylinders.

Other features and advantages will be apparent from the specification and claims and from the accompanying drawings which illustrate an embodiment of the invention.

BRIEF DESCRIPTION OF DRAWINGS

The FIGURE is a schematic of a continuous belt rolling system which may be used to form the mica cylinders of the present invention.

BEST MODE FOR CARRYING OUT THE INVENTION

For purposes of the present invention, the term cylinder or cylindrical should not be limited to a structure having a closed curve cross-section but should include any polygonal cross-sectional structure.

The mica paper used to practice this invention may comprise any conventional, continuous, thin mica paper, however, those made from muscovite or phlogopite mica are preferred. Which material is selected depends on the properties desired in the end product. Typically, where high dielectric properties are desired, muscovite will be used, whereas, if high temperature properties are desired, the phlogopite is generally selected. The mica paper is typically in the form of conventional water-disintegrated, integrated mica paper which may be prepared using conventional techniques. The thickness of the mica paper characteristically ranges from about 2 mils to about 20 mils with about 5 mils being preferred.

The binder which is used to form the mica laminate comprises any of the thermally cross-linkable silicone polymer systems which are used to form other mica laminates. The selection of which system to use depends on the properties desired in the final laminate. Since many of the mica laminates find uses in high temperature environments (about 359° F., 180° C.), it is preferred that the binder system used be thermally stable at these elevated temperatures. The preferred systems are methyl-phenyl polysiloxane or methylpolysiloxane which are available from Dow Corning Corporation, Midland, Mich. as Dow Corning 4-3136, Dow Corning 2104 or 2105 or 2106. These polymers typically cure at temperatures of about 400° F. (204° C.) to about 500° F. (260° C.) or higher, and when cured are thermally stable to temperatures of about 1000° F. (538° C.). It should be noted that the polysiloxane system used to practice this invention should not condense or outgas excessively while curing, for this may cause the formation of a defective laminate through the formation of blisters or voids in the laminate.

Any compatible organic titanate, including the neoalkoxy titanates (available from Kenrich Petrochemicals Inc., Bayonne, N.J.) may be mixed with the polymer system in the range from about 1% to about 4 percent by weight with about 2 percent being preferred. The titanates which are most useful are those which are soluble in the polymer system, i.e. polysiloxane, and do not promote rapid cross-linking of the polymer which will shorten the shelf life of the system. Whether a titanate causes too rapid cross-linking or not is dependent on the manufacturing process which is used to form the cylinders. A manufacturing process which is fast, may tolerate a faster cross-linking process while a slower process will produce an inferior product. Some typical titanates are listed in Table I, with the preferred titanates being those of the monoalkoxy pyrophosphato titanate family.

Table I

Isopropyl, triisostearoyl titanate
Isopropyl, trimethacryl titanate
Isopropyl, triacryltitanate
Isopropyl, tri(tetraethylenetriamino) titanate
Isopropyl, tri(dioctylphosphato) titanate
Isopropyl, tri(dioctylpyrophosphato) titanate
Tri (butyl, octyl pyrophosphato) isopropyl titanate Mono (dioctyl, hydrogen phosphite)
Tetraisopropyl di(tridecylphosphito) titanate
Neoalkoxy, triisostearoyl titanate
Neoalkoxy, dodecylbenzenesulfonyl titanate
Neoalkoxy, tri(dioctylphosphato) titanate
Neoalkoxy, tri(dioctylpyrophosphato) titanate Conventional metal naphthenate driers, associated as soap driers, are added to the base polymer in concentrations from about 0.5 percent to about 2 percent, by weight of the polymer, with about 1 percent being preferred. Examples of such metallic soap driers are manganese naphthenate, zinc naphthenate, tin naphthenate, cobalt naphthenate, etc. It is believed that the addition of these naphthenate driers coupled with the titanates in the relative properties recited are what give these mica laminates their superior moisture resistant properties without deteriorating the other properties recited.

The solvents, which are typically used as carriers for the binder, are organic in nature and may be aliphatic or aromatic with toluene or xylene being preferred. The solvent should be chosen for its compatibility with all of the binder constituents. The amount of solvent is not critical and is typically in the range of from about 40 percent to about 60 percent of the total volume of the solution.

A binder solution containing the above constituents to be applied to the mica paper, is typically prepared as follows: (It should be noted that the sequence of addition of the ingredients is important. The titanate should be added first, then the naphthenate and then the polysiloxane. The sequence is desirable as it allows for a smooth dissolution of the constituent.)

Solvent is placed in a container in which the binder will be prepared. The titanate is then added to the solvent and is stirred until the titanate is dissolved and the solution is clear. Typically, this is done at ambient temperatures about 60° F. (15° C.) to about 85° F. (30° C.). While the stirring continues, the naphthenate drier is added to the solution and stirred until dissolved. Again, this is done at ambient temperatures. To this solution is then added the polysiloxane and the mixture is stirred until homogenous, typically for about one-half hour to one hour at ambient temperatures. The polysiloxane is added in quantities such that the titanate and naphthenate will be in the proper concentrations when the solvent is removed.

The mica paper is removed from the roll and placed on a flat surface, i.e. a table, conveyer belt, etc., and the paper is impregnated with the binder by any conventional technique, i.e. dripping. The amount of the binder applied is such that the final cylinder contains about 5 percent to about 14 percent by weight binder and the application should be such that the binder is evenly distributed throughout the paper. Other conventional impregnation techniques may be used to apply the binder to the paper such as dipping, or roll soaking, spraying, brushing, etc., and in certain processes, it may be desirable to coat both sides of the paper. The aromatic solvent present in the binder is then removed by exposing the paper and binder to temperatures high enough to cause the solvent to evaporate, but not so high as to cause the polymer to polymerize. Typically, these temperatures are about 250° F. (121° C.) to about 275° F. (135° C.). Typically, this is done by passing the paper through an oven or exposing it to radiant heat, etc. The paper is then cooled to ambient temperatures forming a relatively stiff paper sheet.

In addition to the methods described above, the impregnated mica paper may be further processed to more uniformly distribute the binder throughout the paper and densify it prior to forming it into a cylinder under heat and pressure. Typically, this process takes place at temperatures of about 200° F. (93.3° C.) to about 275° F. (135° C.) under sufficient pressure to cause the polymer to flow throughout the mica paper. The pressures generally range from about 100 psi to about 450 psi. This process may be done in conventional press equipment. The length of time the paper is pressed and the particular pressures and temperature parameters to which this processing takes place will vary with the thickness of the paper and the amount of polymer present as well as the particular polymer system. Note Example.

The impregnated paper is then heated to about 350° F. (176.6° C.) to about 400° F. (204.4° C.) to make the paper pliable enough to be wrapped about the form. This may be done by placing the sheet onto a heated platen or placed under a heat source, i.e. infrared lamps or through an oven. Since these temperatures are above the polymerization temperature of the polymer, this heating process must be done quickly so that the polymerization does not advance to such a state as to prevent the material from being rolled. Typically, depending on the thickness of the paper and its state of cure, only a few minutes (1–1.5 minutes) is required to soften it to an adequate state. The determination as to when the paper is pliable enough may be made by checking the flexibility of one corner of the paper. When it bends up easily, it is pliable enough. The optimum condition, temperature and time, will vary with each system and with different thickness papers so this would have to be determined on a case by case basis.

Once the paper has been made pliable or thermoplastic, it may then be formed into a tubular shape. Typically this is done by wrapping the pliable mica paper about an arbor or form. This may be done by hand-wrapping or conventional rolling machines may be used. One such machine-wrapping process is shown in the FIGURE wherein the wrapping machine 10 has a moving belt 20 on rollers 25 which pass over the heated surface 30 carrying the mica sheets 40. An arbor 50, which typically has been coated with a release agent, i.e. Teflon, silicone, etc., is placed in a bend 55 in the belt 20 so that the paper is wrapped about the arbor 50 as the belt 20 passes around it. The bend may be made by placing a rod 60 so as to maintain the belt contact with the arbor for sufficient time to roll the mica onto it. The tube is wrapped to a desired thickness by either winding a series of mica papers about the mandrel or by winding the mica paper from a continuous sheet. No specific tension need be applied when wrapping the impregnated paper about the forming mandrel. The paper need only be taut enough to make a relatively smooth and neat appearing structure which is in the desired form.

Where the mica papers are about 5 mils in thickness or less or where the quantity of polymer is small, less than about 7 percent, an additional adhesive layer may be applied to the inside portion, (that portion which will contact the arbor), of the paper prior to it being wound. This will increase the interlaminar adhesion of the tube and form a better, more stable tubular structure. The wall thickness of these cylinders is typically from about 0.010 inch to about 1 inch.

Once the tube has been formed, the polymeric binder is cured by heating the tube to about 392° F. (200° C.) to about 1000° F. (537.8° C.) causing the binder to cross-link. This is typically done in an oven. The residency time of the cylinders at these temperatures will vary depending on the wall thickness and amount of polymer present in the paper. However, typical times are about 2 hours to about 4 hours. It is important, to restrain the tubes while they are being cured to prevent them from unraveling. This may be done by using a metal mold or by wrapping the structure in a removable layer such as glass cloth or by placing it in a knitted or braided sleeve of fiberglass and drawing it taut. The constraint need not be great but should be present.

Once the tube is cured, it is cooled to ambient temperature and then removed from the constraints and, if not in the finished shape, is machined to the desired dimensions.

The resulting mica cylinders are thermally stable, excellent electrical insulators and have remarkably high moisture resistance as well as very high fracture toughness. All of these properties make them excellent candidates to replace conventional ceramic or glass components which are used in the electrical industry. In addition, these cylinders are not brittle and are dimensionally stable when heated to operating temperatures which makes them superior to glass or ceramic units. In addition, these cylinders possess outstanding dielectric properties.

EXAMPLE

A mica cylinder was prepared according to the present invention as follows:

Two sheets of muscovite paper, each 5 mils in thickness, were impregnated with an average of about 8 percent by weight of a silicone binder wherein the binder comprised 1 percent by weight of solids of isopropyl tri(dioctylpyrophosphato) titanate and 2 percent by weight of solids of zinc naphthenate were prepared. The two sheets were laid one on top of the other and pressed together for 30 minutes at 275° F. at about 450 psi, to uniformly distribute the binder and unite the layers forming a single paper 10 mils thick by 36 inches wide by about 4.7 inches long.

The paper was then serially placed on a platen 30 as shown in FIG. 1 and heated at 450° F. for about 30 seconds to 1 minute. They were then wound around a ½ inch arbor which had been treated with a silicone release agent. The arbor and the uncured mica cylinders were then placed into a glass fiber braid sleeve which was drawn taut about the tube and the arbor. The restrained cylinder was then placed in an oven in a vertical position, and heated to 500° F. for 4 hours to cure the binder material. The cylinders were then cooled and the restraint was removed and the arbor was taken out. The resulting tube had an I.D of ½ inch and a wall thickness of 30 mils. In addition, certain properties of the tube were tested and are shown in the table below:

TABLE II

| | |
|---|---|
| Dielectric Strength: (ASTM D149) | 500 volts average per mil wall thickness |
| ASTM Water Immersion: (ASTM D570, 24 hrs in $H_2O$ @23° C.) | Less than 0.5 percent weight gain |
| Heat Shock: (1 hr @ 500° C.) | No more than 1 percent weight loss |

While this method has been described in terms of one rolling technique, other cylindrical forming techniques such as used with conventional paper rolling equipment or cylindrical forming techniques may also be used.

It is theorized that the superior moisture resistance of these products is a result of surprisingly improved wetting of the mica by the silicone polymer. It may be that the naphthenate and the titanate together create an improved chemical bridge between the mica and the silicone resulting in this improved property as well as the improved fracture toughness and thermal stability.

It should be understood that the invention is not limited to the particular embodiments shown and described herein, but that various changes and modifications may be made without departing from the spirit and scope of this novel concept as defined by the following claims.

We claim:

1. A high density, fracture tough, moisture resistant cylindrical mica composite comprising one or more paper layers consisting essentially of mica, each impregnated with about 5 percent to about 20 percent by weight of a polysiloxane binder, said binder containing about 1 percent to about 4 percent by weight of an organic titanate and about 0.5 percent to about 2 percent by weight of a metal naphthenate, the composite absorbing about 0.5 percent by weight of water after 24 hours of immersion in 23° C. temperature water.

2. The composite of claim 1 wherein the organic titanate is isopropyl tri(dioctylpyrophosphato) titanate.

3. The composite of claim 2 wherein the metal naphthenate is zinc naphthenate.

4. The composite of claim 3 wherein the titanate is present at about 2 percent by weight and the naphthenate is present at about 1 percent by weight.

5. The composite of claim 1 wherein the wall thicknesses of the cylinder is about 0.010 inch to about 1 inch.

* * * * *